United States Patent
Rubin et al.

(10) Patent No.: US 9,954,568 B1
(45) Date of Patent: Apr. 24, 2018

(54) ANTENNA MODULE COMMUNICATION CONTROL IN AN ANTENNA ENCLOSURE SYSTEM

(71) Applicant: Sprint Communications Company L.P., Overland Park, KS (US)

(72) Inventors: William Glenn Rubin, Lawrence, KS (US); Christopher Joseph Mateski, Overland Park, KS (US); Joseph Edwyn Bennett, Olathe, KS (US); Ivan Enrique Blanco, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 7 days.

(21) Appl. No.: 14/314,257

(22) Filed: Jun. 25, 2014

(51) Int. Cl.
*H04B 1/38* (2015.01)

(52) U.S. Cl.
CPC ...................................... *H04B 1/38* (2013.01)

(58) Field of Classification Search
CPC ........ H04B 1/38; H04W 88/10; H04W 24/02; H04W 48/16; H04W 36/0083; H04W 92/20; H04W 28/08; H04W 40/06; H04L 63/20
See application file for complete search history.

(56) References Cited

U.S. PATENT DOCUMENTS

| | | | |
|---|---|---|---|
| 7,616,165 B2 | 11/2009 | Tammisetti et al. | |
| 8,351,987 B2 | 1/2013 | Boch | |
| 8,471,682 B1 * | 6/2013 | Gilboy | G06K 7/10009 340/10.4 |
| 8,599,072 B2 | 12/2013 | Reed et al. | |
| 2007/0063911 A1 * | 3/2007 | Davidson | H01Q 1/246 343/810 |
| 2007/0153696 A1 * | 7/2007 | Choyi | H04L 63/0218 370/235 |
| 2009/0181672 A1 * | 7/2009 | Horn | H04W 68/02 455/435.1 |
| 2010/0279689 A1 * | 11/2010 | Tinnakornsrisuphap | H04W 84/045 455/435.2 |
| 2011/0190006 A1 * | 8/2011 | Kleo | H04W 8/04 455/456.1 |
| 2011/0250868 A1 * | 10/2011 | Peng | H04W 4/08 455/411 |

(Continued)

FOREIGN PATENT DOCUMENTS

| | | |
|---|---|---|
| WO | 2009102775 A2 | 8/2009 |
| WO | 2010065593 A2 | 6/2010 |
| WO | 2013191800 A1 | 12/2013 |

*Primary Examiner* — George Eng
*Assistant Examiner* — Hung Du (57) ABSTRACT

The antenna enclosure includes a control bus that is capable of detecting the installation of a new antenna module. When a new antenna module is discovered by the control bus, a communication policy and a data set is determined for the new antenna module. The data set indicates an internal set of internal antenna modules previously detected in the antenna enclosure, an external set of external antenna modules previously detected in other antenna enclosures and geographic locations of the antenna enclosure and the other antenna enclosures. The antenna enclosure is configured to receive and process module-to-module communications from among antenna modules. Module-to-module communications are filtered based on the communication policy.

14 Claims, 8 Drawing Sheets

(56) References Cited

U.S. PATENT DOCUMENTS

| | | | | |
|---|---|---|---|---|
| 2014/0155046 A1* | 6/2014 | Morrill | ............... | H04W 24/02 |
| | | | | 455/418 |
| 2015/0080020 A1* | 3/2015 | Edge | .................. | G01S 5/0236 |
| | | | | 455/456.1 |
| 2015/0085680 A1* | 3/2015 | Vrzic | .................. | H04L 5/0055 |
| | | | | 370/252 |
| 2015/0109999 A1* | 4/2015 | Godin | ................. | H04W 92/20 |
| | | | | 370/328 |
| 2015/0312776 A1* | 10/2015 | Cui | ..................... | H04W 24/02 |
| | | | | 370/235 |

* cited by examiner

ANTENNA MODULE COMMUNICATION CONTROL IN AN ANTENNA ENCLOSURE SYSTEM

TECHNICAL BACKGROUND

Wireless networks provide data communication services to their users using wireless signals over the air. These wireless communication services include Internet access, voice calling, gaming, file transfers and the like. To provide the services over large geographic areas, wireless access points are deployed by various wireless networks in a complex overlay architecture. There are millions of wireless access points at various locations around the world.

The wireless access points each include antenna systems that exchange wireless signals with user devices over the air. The antenna systems typically include several metallic antenna elements that are electronically driven to perform their wireless communication function. Antenna enclosures are installed to protect the antenna elements from environmental stress such as weather, animals, and the like. The antenna enclosures include power systems, environmental control systems, data communication interfaces, and other systems.

Some antenna enclosures support the installation of antenna modules. The antenna modules typically include amplifiers, filters, modulators, antenna elements and other signal processing components. In some cases, the antenna modules are designed for rapid and massive deployments. For example, a given wireless network may install thousands of antenna modules from different manufacturers in hundreds of antenna enclosures over a relatively short time frame. The network communications and supporting data that the antenna enclosures provide to the antenna modules is not effective or efficient in such a complex and dynamic environment.

OVERVIEW

The antenna enclosure includes a control bus that is capable of detecting the installation of a new antenna module. When a new antenna module is discovered by the control bus, a communication policy and a data set is determined for the new antenna module. The data set indicates an internal set of internal antenna modules previously detected in the antenna enclosure, an external set of external antenna modules previously detected in other antenna enclosures and geographic locations of the antenna enclosure and the other antenna enclosures. The antenna enclosure is configured to receive and process module-to-module communications from among antenna modules. Module-to-module communications are filtered based on the communication policy.

DETAILED DESCRIPTION

Figure 1:
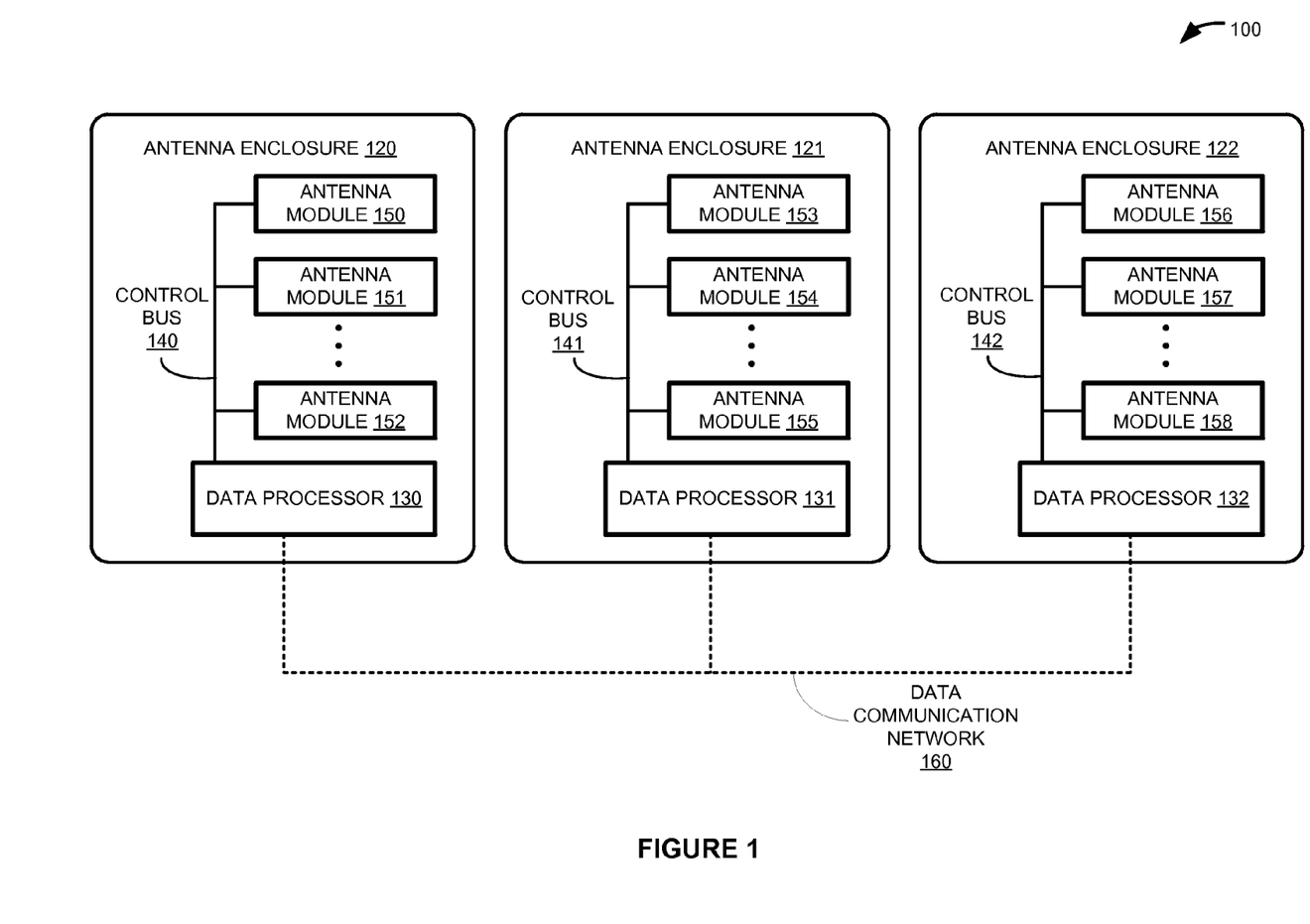
FIGS. 1-3 illustrate an antenna enclosure system to control communications between antenna modules.

FIG. 1 illustrates antenna enclosure system 100 to control communications between antenna modules 150-158. Antenna enclosure system 100 comprises antenna enclosures 120-122 and data communication network 160. Antenna enclosure 120 comprises data processor 130, control bus 140, and antenna modules 150-152. Antenna enclosure 121 comprises data processor 131, control bus 141, and antenna modules 153-155. Antenna enclosure 122 comprises data processor 132, control bus 142, and antenna modules 156-158.

Data communication network 160 uses protocols such as Long Term Evolution (LTE), Wireless Fidelity (WiFi), Ethernet, and Internet Protocol (IP)—including combinations thereof. Antenna enclosures 120-122 comprise radomes, cabinets, cages, and/or some other structure to house antenna components. Data processors 130-132 comprise processing circuitry, memory, software, communications transceivers, and/or some other electronic components. Control buses 140-142 comprise IEEE 1394, PCI, PCMCIA, USB, and/or some other data communication apparatus—including combinations thereof. Antenna modules 150-158 comprise modulator, amplifiers, filters, antenna elements, and/or some other radio transceiver equipment.

Data processors 130-132 communicate with each other over data communication network 160. Data processor 130 and antenna modules 150-152 communicate over control bus 140. Data processor 131 and antenna modules 153-155 communicate over control bus 141. Data processor 132 and antenna modules 156-158 communicate over control bus 142.

Antenna modules 150-158 communicate with one another through data communication network 160 and data processors 130-132. Data processors 130-132 control these module-to-module communications based on communication policies for the communicating antenna modules. For example, data processor 130 may allow/deny communications between antenna module 150 and antenna module 152 over control bus 140. Likewise, data processors 131-132 may allow/deny communications between antenna module 154 and antenna module 156 over control bus 141, control bus 142, and data communication network 160.

The communication policies comprise software data executed by data processors 130-132 to filter communications between antenna modules. The communication policies filter module-to-module communications based on manufacturer, antenna type, communication type, network conditions, and/or some other parameters. For example, a communication policy may only allow communications between antenna modules of the same model. Another communication policy may only allow communications between antenna modules in a proximate geographic region.

Data processor 130 automatically detects the electronic coupling of antenna modules 150-152 to control bus 140. Data processor 131 automatically detects the electronic coupling of antenna modules 153-155 to control bus 141. Data processor 132 automatically detects the electronic coupling of antenna modules 156-158 to control bus 142. In response to the detection of a new antenna module, the data processor gathers and transfers a data set to the new antenna module. For example, data processor 131 may detect the electronic coupling of antenna module 154 to control bus 141, and in response, data processor 131 may develop information related to other antenna modules, antenna enclosures, topography, network conditions, atmospheric data, function commands, operational policies, software updates, and the like.

The data set includes an internal set of internal antenna modules previously detected in the antenna enclosure. For example, new antenna module 154 might be informed of the presence and location of internal antenna modules 153 and 155 within enclosure 121. The data set also includes an external set of external antenna modules. For example, new antenna module 154 might be informed of the presence and location of antenna enclosure 120 and its antenna modules 150-152.

Figure 2:
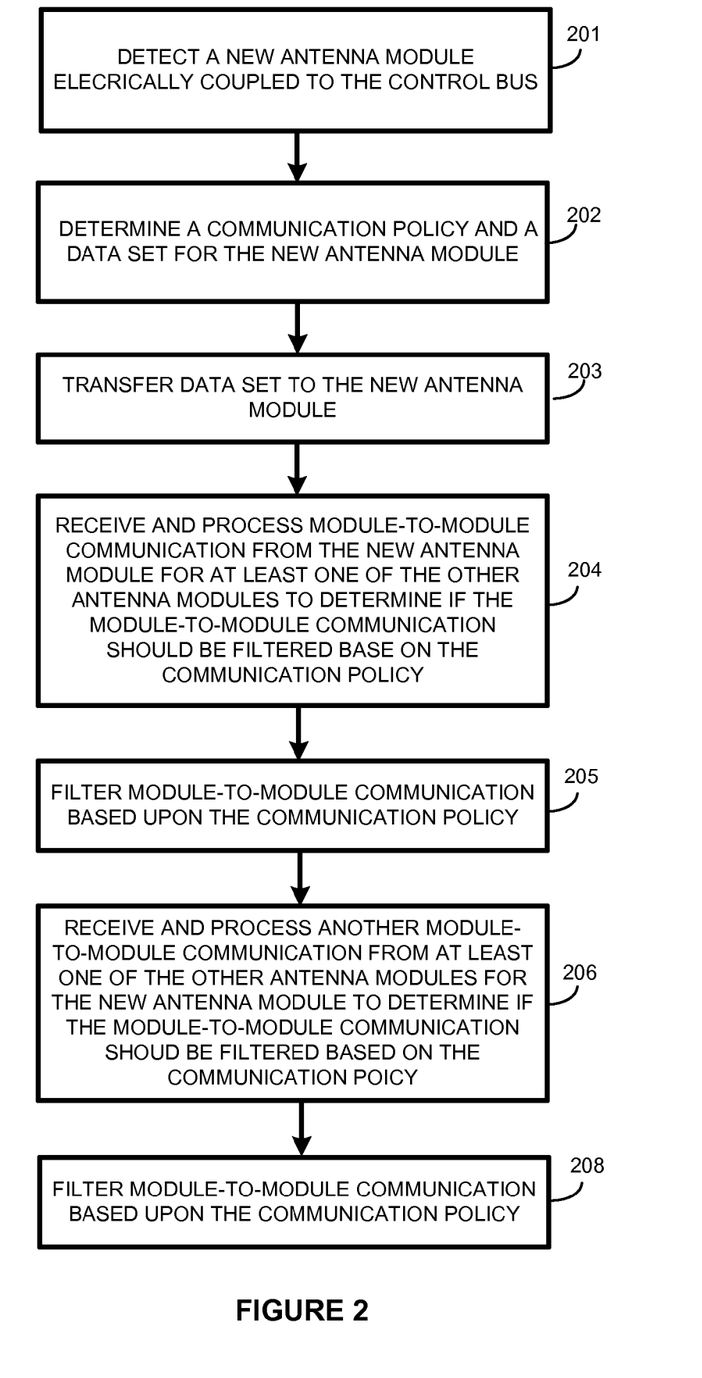

FIG. 2 illustrates the operation of antenna enclosure system 100 to control communications between antenna modules 150-158. The operation is described with respect to antenna enclosure 120, although enclosures 121-122 would typically operate in a similar manner. Antenna enclosure 120 detects the electronic coupling of new antenna module 150 to control bus 140 (201). The antenna module detection may entail plug and play pairing, device advertisement/request protocols, current/voltage detection, or some other data apparatus detection technique. Data processor 130 determines a communication policy and a data set for new antenna module 150 (202). For example, a communication policy and data set may be determined by acquiring a module identifier for antenna module 150 and accessing a network configuration database with the module identifier. Data processor 130 transfers the data set to new antenna module 150 (203).

Data processor 130 receives and processes a module-to-module communication from new antenna module 150 for one or more of antenna modules 151-158 to determine if the module-to-module communication should be filtered based on the communication policy (204). For example, the communication policy may specify that that antenna module 150 may only transfer communications to antenna modules 151, 153, 154, 156, and 157, but not to antenna modules 152, 155, and 158. Data processor 130 filters the module-to-module communication based upon the communication policy (205).

Data processor 130 receives and processes another module-to-module communication from antenna module 153 for new antenna module 150 to determine if the module-to-module communication should be filtered based on the communication policy (206). For example, the communication policy may specify that that antenna module 150 may only receive communications from antenna modules 151, 153, 154, 156, and 157, but not from antenna modules 152, 155, and 158. Data processor 130 filters the module-to-module communication based upon the communication policy (208).

Figure 3:
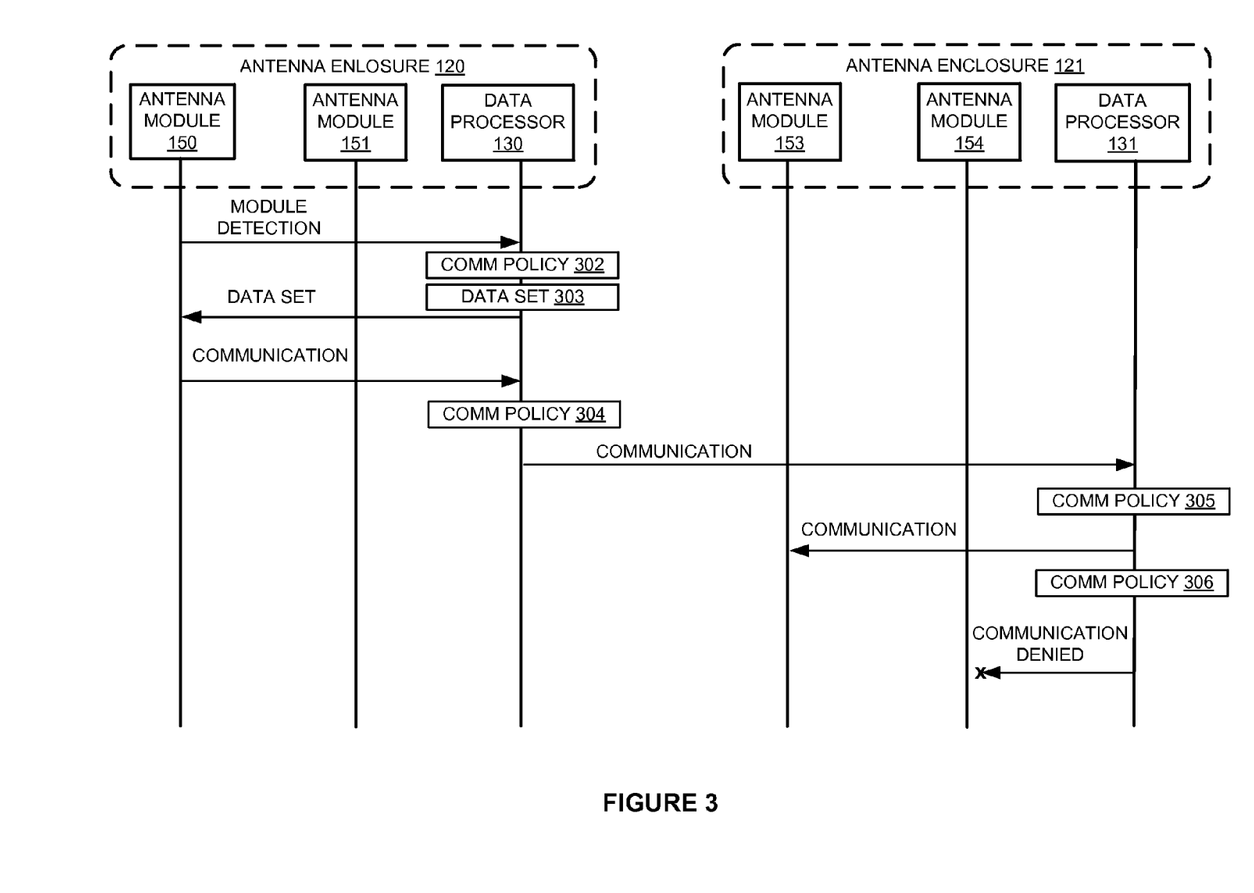

FIG. 3 illustrates the operation of antenna enclosure system 100 to control communications between antenna modules 150-158. New antenna module 150 is installed in antenna enclosure 120 and detected by data processor 130. Data processor 130 determines communication policy 302 and data set 303 for antenna module 150 and transfers data set 303 to new antenna module 150.

New antenna module 150 transfers a module-to-module communication intended for antenna modules 153-154. Data processor 130 filters the module-to-module communication based on communication policy 304 for module 150. Data processor 130 determines that communication policy 304 allows the module-to-module communication to be transferred to antenna modules 153-154. Data processor 130 transfers the communication to data processor 131. Data processor 131 transfers the communication to antenna module 153 based on communication policy 305. Data processor 331 filters the communication based on communication policy 306 for antenna module 154 and blocks the communication to antenna module 154.

Figure 4:
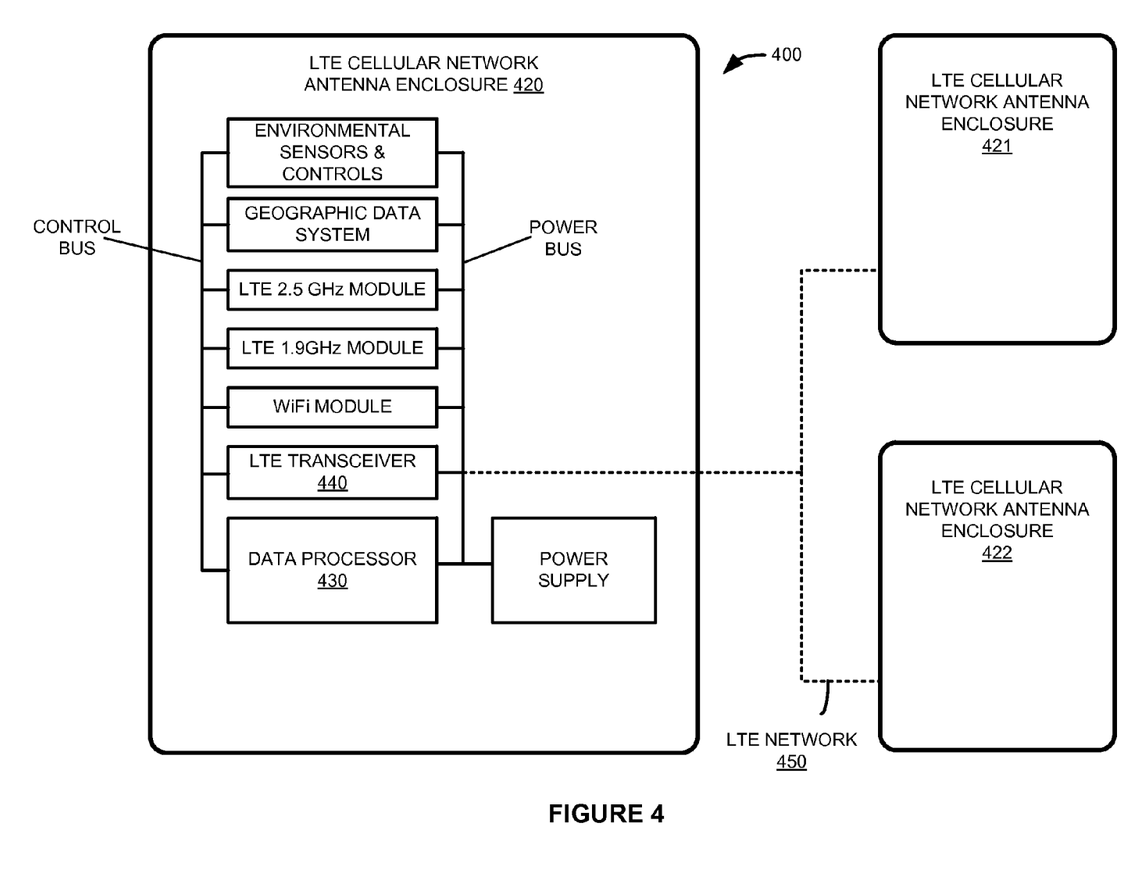
FIGS. 4-5 illustrate antenna enclosures to control communications between antenna modules.

FIG. 4 illustrates antenna enclosure system 400 to control communications between antenna modules. Antenna enclosure system 400 provides an example of antenna enclosure system 100, although antenna enclosure system 100 may have alternative configurations and operations. Antenna enclosure system 400 comprises LTE cellular network antenna enclosures 420-422 and LTE network 450. Antenna enclosure 420 comprises environmental sensors and controls, geographic data system, LTE 2.5 GHz module, LTE 1.9 GHz module, WiFi module, LTE transceiver 440, data processor 430, control bus, power bus, and a power supply. LTE Transceiver 440 exchanges communications between LTE cellular network enclosure 420 and LTE cellular network enclosures 421-422 via LTE network 450. The control bus couples data processor 430 to the environmental sensors and controls, geographic data system, LTE 2.5 GHz module, LTE 1.9 GHz module, WiFi module, and LTE Transceiver.

Environmental sensors comprise thermometers, hygrometers, barometers, and the like to generate data indicating temperature, humidity, barometric pressure, precipitation, and other environmental data. The environmental data is made available to the antenna modules via data processor 430 over the control bus according to the communication policies for the modules.

The geographic data system comprises a data repository for detailed and proximate geographic data for the surrounding area. The geographic data system may be updated by the LTE network or through data processor 430. The geographic data includes latitude, longitude, and elevation for various antenna modules and enclosures. The geographic data includes topographic information indicating nearby structures, foliage type, bodies of water, radio noise sources, geographic features, and the like. The geographic data is made available to the antenna modules via the data processors over the control bus according to the communication policies for the modules.

The communication policies are versatile and configurable to filter communications based on any desirable parameter. For example, the communication policies may only allow module-to-module communications between antenna modules from a common manufacturer, or particular types of antenna modules. The communication policies may filter module-to-module communications so that some antenna modules are undetectable, making those antenna modules invisible on the network. The communication policies might only allow communications between antenna modules within a specified range of elevations. The communication policies can also determine if environmental or geographic data may be transferred. The communication policies may use access control lists, such as blacklists and whitelists, to control module-to-module communications. The communication policies may implement differing degrees of filtration.

Figure 5:
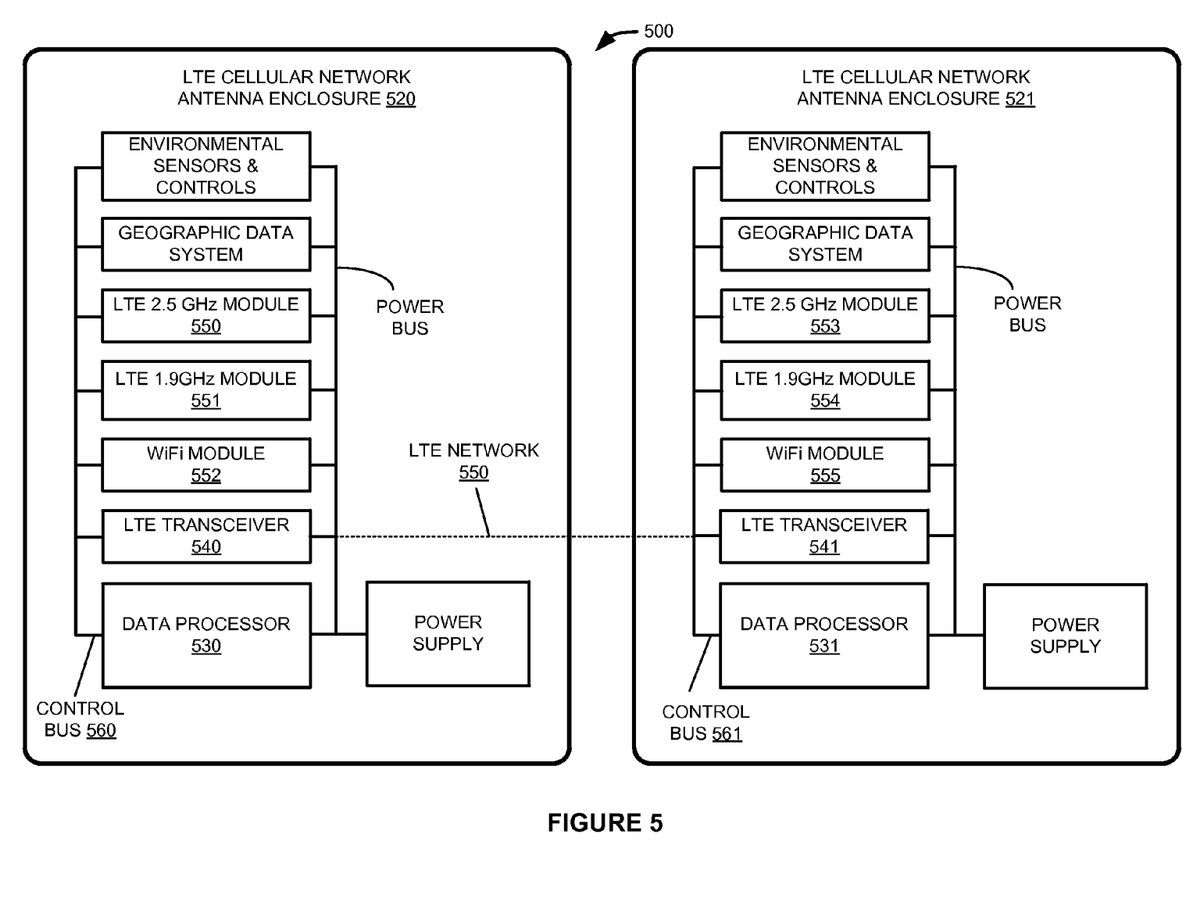

FIG. 5 illustrates the operation of antenna enclosure system 500 to control communications between antenna modules 550-555. Antenna enclosure system 500 provides an example of antenna enclosure system 100, although antenna enclosure system 100 may have alternative configurations and operations. Antenna enclosure system 500 comprises LTE cellular network antenna enclosures 520-521 and LTE network 550. Antenna enclosure 520 comprises environmental sensors and controls, geographic data system, LTE 2.5 GHz module 550, LTE 1.9 GHz module 551, WiFi module 552, LTE transceiver 540, data processor 530, control bus 560, power bus, and power supply. Antenna enclosure 521 comprises environmental sensors and controls, geographic data system, LTE 2.5 GHz module 553, LTE 1.9 GHz 554, WiFi antenna 555, LTE transceiver 541, data processor 531, control bus 561, power bus, and power supply. LTE transceiver 540 exchanges communications between LTE cellular network enclosure 520 and LTE cellular network enclosure 521 via LTE network 550. LTE transceiver 541 exchanges communications between LTE cellular network enclosure 521 and LTE cellular network enclosure 520 via LTE network 550. Data processors 530, 531 are directed by software applications to generate data sets and/or transfer data sets according to communication policies when executed by processor circuitry.

Control bus 560 couples data processor 530 to the environmental sensors and controls, geographic data system, LTE 2.5 GHz module 550, LTE 1.9 GHz module 551, and WiFi module 552. Control bus 561 couples data processor 531 to the environmental sensors and controls, geographic data system, LTE 2.5 GHz module 553, LTE 1.9 GHz module 554, and WiFi module 555. The power buses couple the power supply to the sensors and controls, data systems, modules and data processors.

Figure 6:
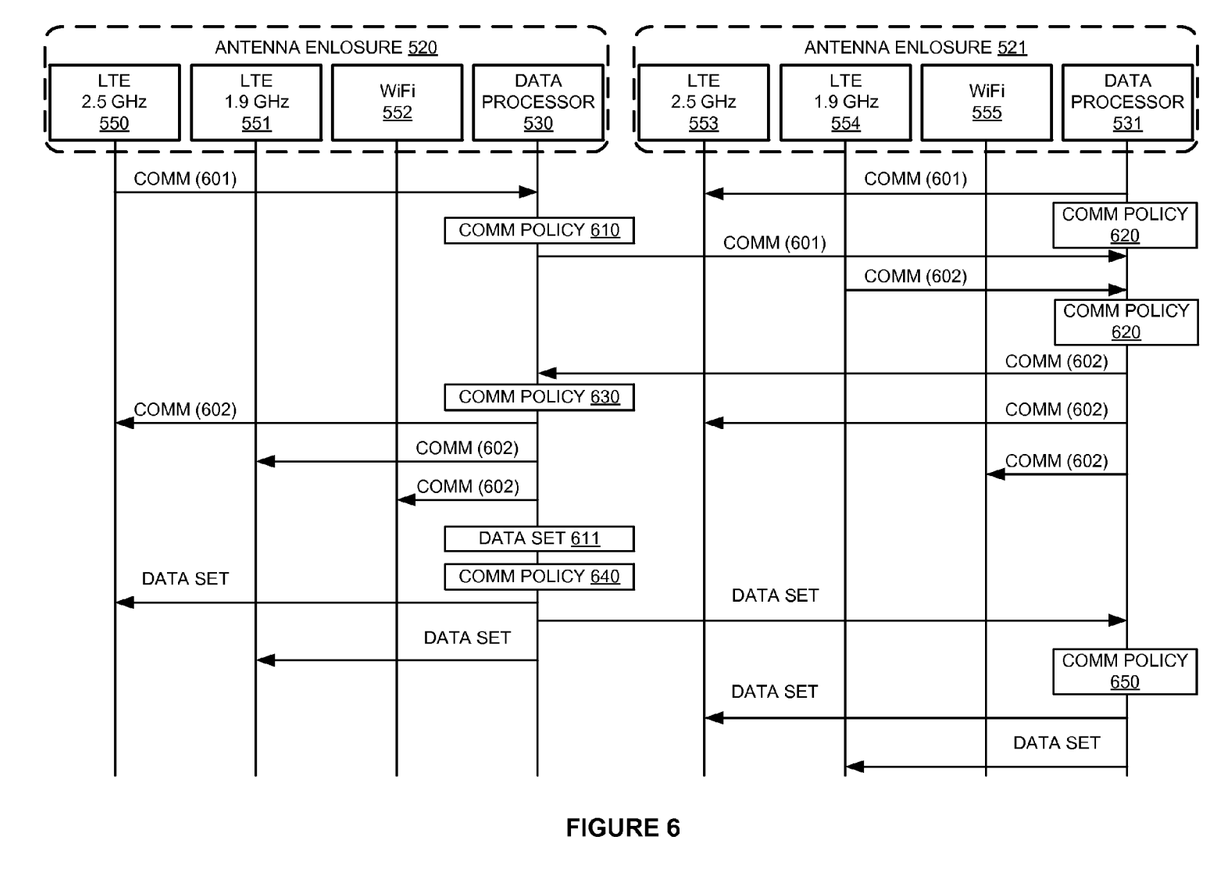
FIG. 6 illustrates the operation of an antenna enclosure to control communications between antenna modules.

FIG. 6 illustrates the operation of antenna enclosure system 500 to control communications between antenna modules 550-555. LTE 2.5 GHz module 550 transfers communication 601 for LTE 2.5 GHz module 553 to data processor 530. Data processor 530 receives communication 601, and based on communication policy 610, determines that LTE 2.5 GHz module 550 is allowed to transfer communication 601. Data processor 530 transfers communication 601 to data processor 531. Data processor 531 receives communication 601, and based on communication policy 620 for LTE 2.5 GHz module 553, determines that LTE 2.5 GHz module 553 is allowed to receive communication 601. Data processor 531 transfers communication 601 to 2.5 GHz module 553.

LTE 1.9 GHz module 554 transfers communication 602 intended for receipt by all antenna modules 550-555 to data processor 531. Data processor 531 receives communication 602, and based on communication policy 630, determines that LTE 1.9 GHz module 554 is allowed to transfer communication 602. Data processor 531 transfers communication 602 to data processor 530, LTE 2.5 GHz module 553 and WiFi module 555. Data processor 530 receives communication 602, and based on communication policy 640, determines that communication 602 is allowed for LTE 2.5 GHz module 550, LTE module 551, and WiFi module 552. Data processor 530 transfers communication 602 to LTE 2.5 GHz module 550, LTE 1.9 GHz module 551, and WiFi module 552.

Data processor 530 generates data set 611 intended for transfer to LTE antenna modules 551-551,553-554. Data processor 530 may generate a data set based on changes in measurements from environmental sensors, at pre-determined time intervals, or software updates for example. Data processor 530 determines that data set 611 is allowed to be transferred to LTE 2.5 GHz module 550, LTE 1.9 GHz module 551, and data processor 531 according to communication policy 650. Data processor 531 receives data set 611, and based on communication policy 660, determines that LTE 2.5 GHz module 553 and LTE 1.9 GHz module 554 are allowed to receive data set 611. Data processor 531 transfers data set 611 to LTE 2.5 GHz module 553, LTE 1.9 GHz module 554.

Figure 7:
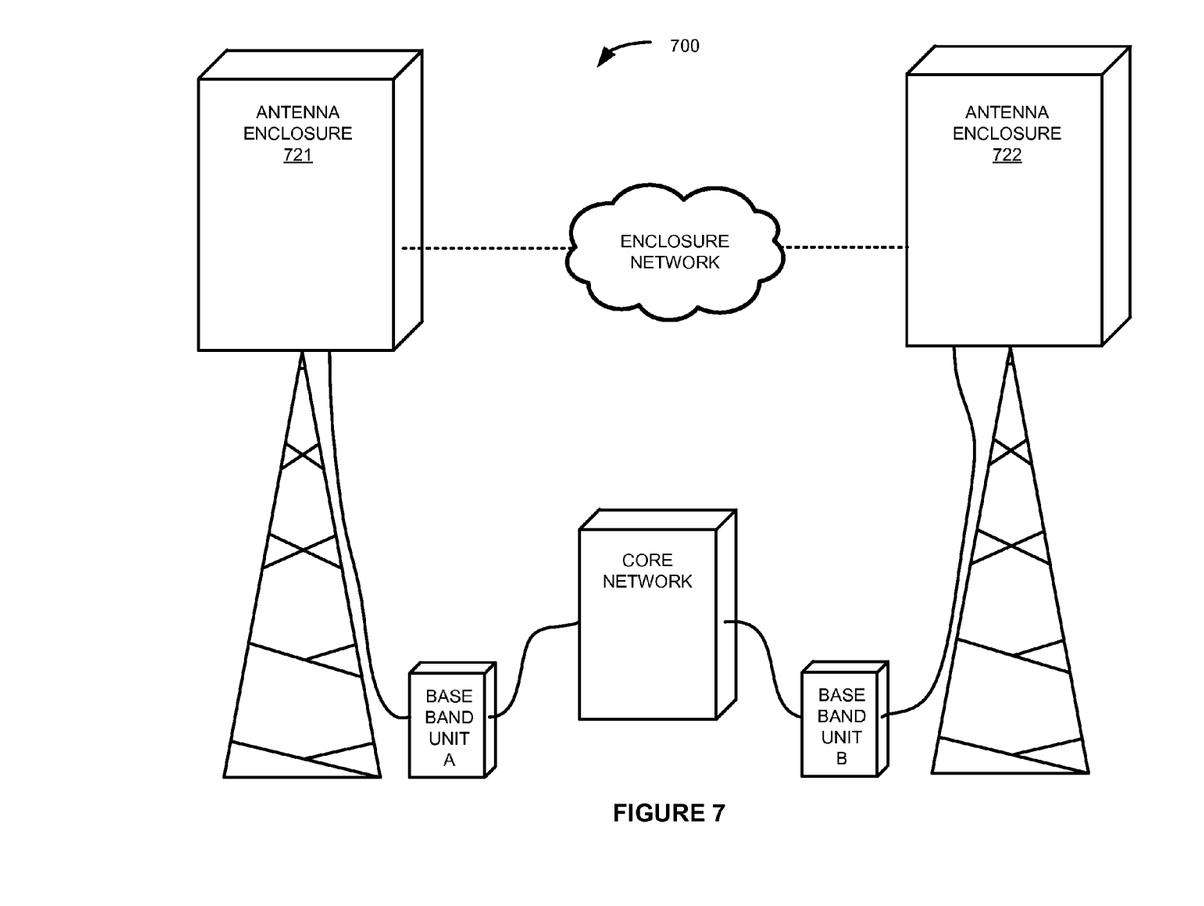
FIG. 7 illustrates an antenna enclosure system to control communications between antenna modules.

FIG. 7 illustrates antenna enclosure system 700 to control communications between antenna modules. Antenna enclosure system 700 provides an example of antenna enclosure system 100, although antenna enclosure system 100 may have alternative configurations and operations. Antenna enclosure system 700 comprises antenna enclosures 721-722, enclosure network, towers, base band units and a core network. Enclosure network can be Ethernet, the Internet, wireless network or some other network that permits data transfer. Module-to-module communications may be transferred over the enclosure network. Additionally, data sets may be transferred between data processors over the enclosure network. The type and content of data transferred over the enclosure network is limited by the communication policy. Antenna enclosures 721-722 allow the antenna modules to communicate with traditional base band units and the core network.

Figure 8:
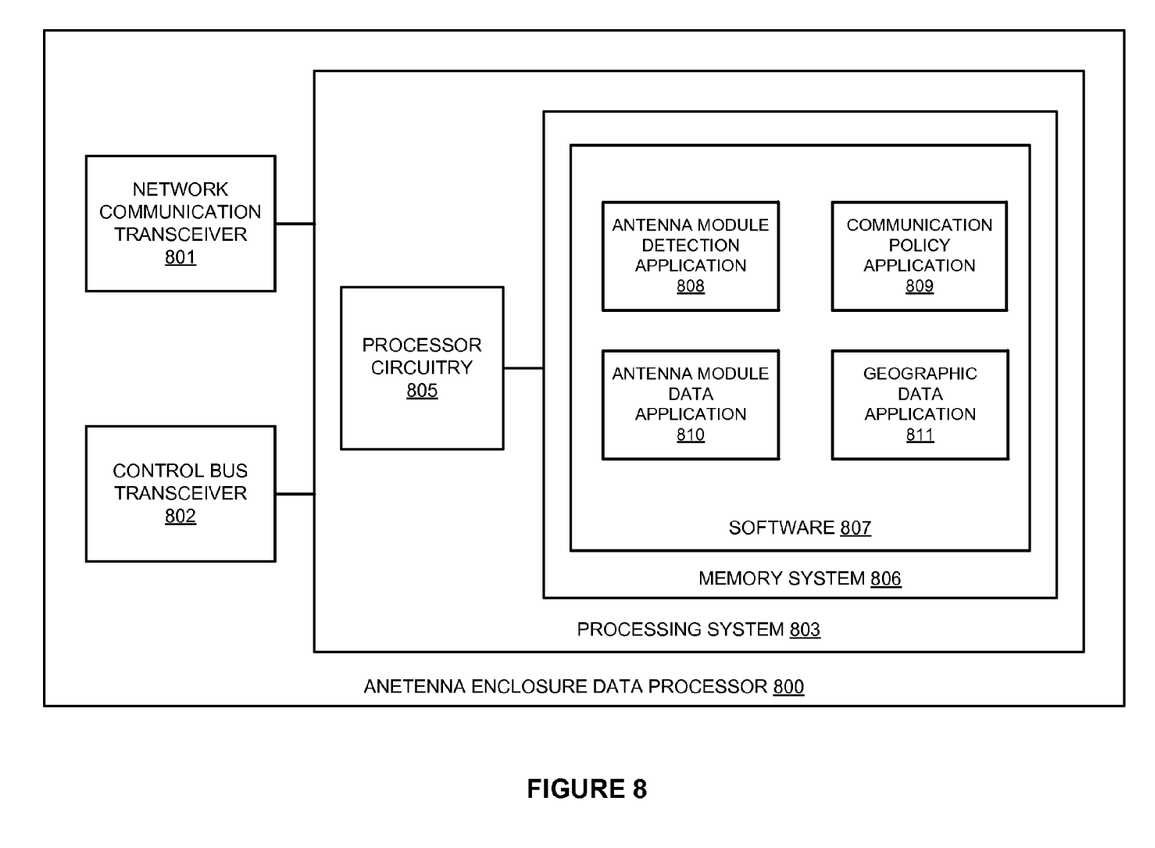
FIG. 8 illustrates an antenna enclosure data processor to control communications between antenna modules.

FIG. 8 illustrates antenna enclosure data processor 800 to control communications between antenna modules. Antenna enclosure data processor 800 provides an example of data processors 130-132, although data processors may have alternative configurations and operations. Antenna enclosure data processor 800 comprises network communication transceiver 801, control bus transceiver 802, and processing system 803. Processing system 803 is linked to network communication transceiver 801 and control bus transceiver 802. Processing system 803 comprises processor circuitry 805 and memory system 806 that stores software 807. Software 807 comprises software applications 808-811.

Network communication transceiver 801 comprises components that communicate over communication links, such as network cards, ports, RF transceivers, processing circuitry and software, or some other communication components. Network communication transceiver 801 may be configured to communicate over metallic, wireless, or optical links. Network communication transceiver 801 may be configured to use TDM, IP, Ethernet, optical networking, wireless protocols, communication signaling, or some other communication format—including combinations thereof. Network communication transceiver 801 may be configured to send and receive module-to-module communications and data set transfers over the enclosure network.

Control bus transceiver 802 comprises components that communicatively couple antenna modules, transceivers, environmental apparatus, geographic apparatus and processing circuitry 805 to a control bus. Control bus transceiver 802 comprises communication interfaces such as IEEE 1394, PCI, PCI Express, PCMCIA, USB, and/or some other type of electronic communication interface—including combinations thereof Processor circuitry 805 comprises microprocessor and other circuitry that retrieves and executes software 807 from memory system 806. Processor circuitry 805 may comprise a single device or could be distributed across multiple devices—including devices in different geographic areas. Processor circuitry 805 may be embedded in various types of equipment. Memory system 806 comprises a non-transitory computer readable storage medium, such as a disk drive, flash drive, data storage circuitry, or some other hardware memory apparatus. Memory system 806 may comprise a single device or could be distributed across multiple devices—including devices in different geographic areas. Memory system 806 may be embedded in various types of equipment. In some examples, a computer apparatus could comprise memory system 806 and software 807. Software 807 comprises computer programs, firmware, or some other form of machine-readable processing instructions. Software 807 may include an operating system, utilities, drivers, network interfaces, applications, or some other type of software. In this example, software 807 comprises software applications 808-811, although software 807 could have alternative configurations in other examples.

Antenna module detection application 808 directs processing system 803 to operate as described herein when executed by processor circuitry 805. Antenna module detection application 808 directs processing system 803 to identify new antenna modules and install and/or configure software allowing a new antenna module to operate. For example, antenna module detection application 808 directs processing system 803 to acquire the make, model, and serial number of a new antenna module, reference a lookup table, and install the appropriate software for the new antenna module.

Communication policy application 809 directs processing system 803 to operate as described herein when executed by processor circuitry 805. Communication policy application 809 directs processing system 803 to implement the communication policy to filter module-to-module communications. For example, communication policy application 809 directs processing system to filter module-to-module communications based upon the communication policy.

Antenna module data application 810 directs processing system 803 to operate as described herein when executed by processor circuitry 805. Antenna module data application directs processing system 803 to collect, process and transmit antenna module data. For example, antenna module data application 810 collects antenna module data comprising manufacturer, model, and operating specifications and processes that data along with geographic data, and compiles a data set suitable for transmission to antenna modules. Antenna module data application 810 directs processing system 803 to update antenna module operating software. For example, antenna module operating software 810 directs processing system 803 to transmit a new version of antenna module operating software that fixes some known bugs to antenna modules.

Geographic data application 811 directs processing system 803 to operate as described herein when executed by processor circuitry 805. Geographic data application 811 directs processing system 803 to collect, process and transmit geographic data. For example, geographic data application collects geographic data comprising latitude, longitude and altitude data from a data repository, processes that data along with a listing of antenna modules, and compiles a data set suitable for transmission to antenna modules. Geographic data application 811 also handles topographical data.

Referring back to antenna enclosure system 100 of FIG. 1. Antenna enclosures 120-122 may be made in a variety of shapes and sizes. For example, antenna enclosures 120-122 can be spherical, cylindrical, prismatic, or shaped to camouflage the enclosure to look like a tree, an architectural element, or some other item common to the local environment. Antenna enclosures are constructed from radio opaque materials comprising plastics, fiberglass, resins and/or combinations thereof. Data communication network 160 is a communications network that allows antenna enclosures 120-122 to exchange data. Data communication network 160 comprises network links, nodes, and other network elements including combinations thereof. Network links comprise metallic, wireless, optical or some other network link including combinations thereof. Network hardware comprises routers, computers, gateways, switches and other hardware including combinations thereof. Communications are transmitted using network communication protocols comprising TDM, IP, Ethernet, optical networking, wireless, communication signaling, or some other communication format including combinations thereof.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an antenna enclosure, the method comprising:

in the antenna enclosure, detecting installation of a new antenna module electrically coupled to a control bus in the antenna enclosure, and in response, determining a communication policy for the new antenna module, determining a data set for the new antenna module, and transferring the data set to the new antenna module, wherein the data set indicates a plurality of antenna modules comprising an internal set of internal antenna modules previously detected in the antenna enclosure and an external set of external antenna modules previously detected in other antenna enclosures, the data set further indicates geographic locations of the antenna enclosure and the other antenna enclosures, and the communication policy allows communications between the new antenna module and ones of the plurality of antenna modules of a common manufacturer;

in the antenna enclosure, receiving a module-to-module communication from the new antenna module for delivery to a first antenna module and a second antenna module of the plurality of antenna modules, processing the module-to-module communication with the communication policy to determine that the communication policy allows the new antenna module to transfer the module-to-module communication to the first antenna module but denies the new antenna module to transfer the module-to-module communication to the second antenna module, and then transferring the module-to-module communication to the first antenna module and blocking the module-to-module communication to the second antenna module based on the communication policy that allows the communications between the new antenna module and the ones of the plurality of antenna modules of a common manufacturer.

2. The method of claim 1 wherein the new antenna module comprises a Long Term Evolution (LTE) module.

3. The method of claim 1 wherein the communication policy allows communications between the new antenna module and ones of the plurality of antenna modules in a proximate geographic region.

4. The method of claim 1 wherein the geographic locations of the antenna enclosure and the other antenna enclosures comprise altitude data.

5. The method of claim 1 wherein the data set indicates internal positions of the internal set of internal antenna modules.

6. The method of claim 1 wherein the communication policy filters communications between particular types of the plurality of antenna modules.

7. The method of claim 1 wherein the communication policy allows communications between the new antenna module and ones of the plurality of antenna modules within a specified range of elevations.

8. An antenna enclosure comprising:
   an antenna module control bus configured to electrically couple to at least one antenna module;
   a data processor configured to detect installation of a new antenna module electrically coupled to the control bus in the antenna enclosure, and in response, determine a communication policy for the new antenna module, determine a data set for the new antenna module, and transfer the data set to the new antenna module, wherein the data set indicates a plurality of antenna modules comprising an internal set of internal antenna modules previously detected in the antenna enclosure and an external set of external antenna modules previously detected in other antenna enclosures, the data set further indicates geographic locations of the antenna enclosure and the other antenna enclosures, and the communication policy allows communications between the new antenna module and ones of the plurality of antenna modules of a common manufacturer;
   the data processor further configured to receive a module-to-module communications from the new antenna module for delivery to a first antenna module and a second antenna module of the plurality of antenna modules, process the module-to-module communication with the communication policy to determine that the communication policy allows the new antenna module to transfer the module-to-module communication to the first antenna module but denies the new antenna module to transfer the module-to-module communication to the second antenna module, and then transfer the module-to-module communication to the first antenna module and block the module-to-module communication to the second antenna module based on the communication policy that allows the communications between the new antenna module and the ones of the plurality of antenna modules of a common manufacturer.

9. The antenna enclosure of claim 8 wherein the new antenna module comprises a Long Term Evolution (LTE) antenna module.

10. The antenna enclosure of claim 8 wherein the communication policy allows communications between the new antenna module and ones of the plurality of antenna modules in a proximate geographic region.

11. The antenna enclosure of claim 8 wherein the geographic locations of the antenna enclosure and the other antenna enclosures comprise altitude data.

12. The antenna enclosure of claim 8 wherein the data set indicates internal positions of the internal data set of internal antenna modules.

13. The antenna enclosure of claim 8 wherein the communication policy filters communications between particular types of the plurality of antenna modules.

14. The antenna enclosure of claim 8 wherein the communication policy allows communications between the new antenna module and ones of the plurality of antenna modules within a specified range of elevations.

* * * * *